(12) United States Patent
Dierbach et al.

(10) Patent No.: US 12,146,805 B2
(45) Date of Patent: Nov. 19, 2024

(54) DEVICE FOR PNEUMATICALLY DRIVING A ROTOR IN A BALANCING MACHINE, AND BALANCING MACHINE HAVING A DEVICE OF SAID TYPE

(71) Applicant: Schenck RoTec GmbH, Darmstadt (DE)

(72) Inventors: Florian Dierbach, Darmstadt (DE); Tobias Jaeger, Zwingenberg (DE); Julian Scheuring, Darmstadt (DE); Constantin Voelzel, Darmstadt (DE)

(73) Assignee: Schenck RoTec GmbH, Darmstadt (DE)

( * ) Notice: Subject to any disclaimer, the term of this patent is extended or adjusted under 35 U.S.C. 154(b) by 375 days.

(21) Appl. No.: 17/778,688

(22) PCT Filed: Nov. 6, 2020

(86) PCT No.: PCT/DE2020/100954
§ 371 (c)(1),
(2) Date: May 20, 2022

(87) PCT Pub. No.: WO2021/104565
PCT Pub. Date: Jun. 3, 2021

(65) Prior Publication Data
US 2023/0044931 A1    Feb. 9, 2023

(30) Foreign Application Priority Data
Nov. 27, 2019   (DE) ..................... 10 2019 132 197.2

(51) Int. Cl.
*G01M 1/06*   (2006.01)
*G01M 1/16*   (2006.01)

(52) U.S. Cl.
CPC ................ *G01M 1/06* (2013.01); *G01M 1/16* (2013.01)

(58) Field of Classification Search
CPC ............ G01M 1/02; G01M 1/04; G01M 1/06; G01M 1/16; G01M 1/18; G01M 1/24
See application file for complete search history.

(56) References Cited

U.S. PATENT DOCUMENTS

| 3,834,144 | A | * | 9/1974 | Franzen | .................. D01H 7/86 |
| | | | | | 57/58.7 |
| 4,467,649 | A | * | 8/1984 | Mueller | .................. G01M 1/26 |
| | | | | | 73/462 |

(Continued)

FOREIGN PATENT DOCUMENTS

| DE | 10 2005 053 786 A1 | 5/2007 |
| DE | 10 2012 102 160 B4 | 3/2014 |

(Continued)

OTHER PUBLICATIONS

International Search Report in PCT/DE2020/100954, mailed Feb. 15, 2022.

*Primary Examiner* — Herbert K Roberts
(74) *Attorney, Agent, or Firm* — Collard & Roe, P.C.

(57) ABSTRACT

A device for pneumatically driving a rotor in a balancing machine has at least one drive nozzle, which is connectable to a compressed-air line and which serves for generating a driving air stream which can be directed onto the rotor, and at least one braking nozzle, which is connectable to a compressed-air line and which serves for generating a braking air flow. The braking air flow can be directed onto the rotor in a direction opposite to the direction of rotation of the rotor. Also a base plate is arrangeable with a spacing to the rotor and on the base plate, the nozzles are movably arranged, such that the spacing between nozzles and rotor is adjustable.

15 Claims, 1 Drawing Sheet

(56) References Cited

U.S. PATENT DOCUMENTS

| | | | |
|---|---|---|---|
| 2008/0289416 A1 | 11/2008 | Thelen | |
| 2015/0037150 A1* | 2/2015 | Hoerr | G05D 13/62 |
| | | | 416/1 |
| 2015/0337846 A1* | 11/2015 | Thelen | F04D 17/10 |
| | | | 415/1 |
| 2016/0333888 A1* | 11/2016 | Miyahara | F04D 29/051 |

FOREIGN PATENT DOCUMENTS

| | | | | |
|---|---|---|---|---|
| DE | 10 2013 102 519 A1 | 10/2014 | | |
| EP | 0699900 B1 * | 1/2002 | | |
| EP | 1219943 A2 * | 7/2002 | | G01M 1/36 |
| EP | 2581553 A1 * | 4/2013 | | F01D 21/003 |
| FR | 926032 A | 4/1946 | | |
| JP | H07-43630 Y2 | 10/1995 | | |

* cited by examiner

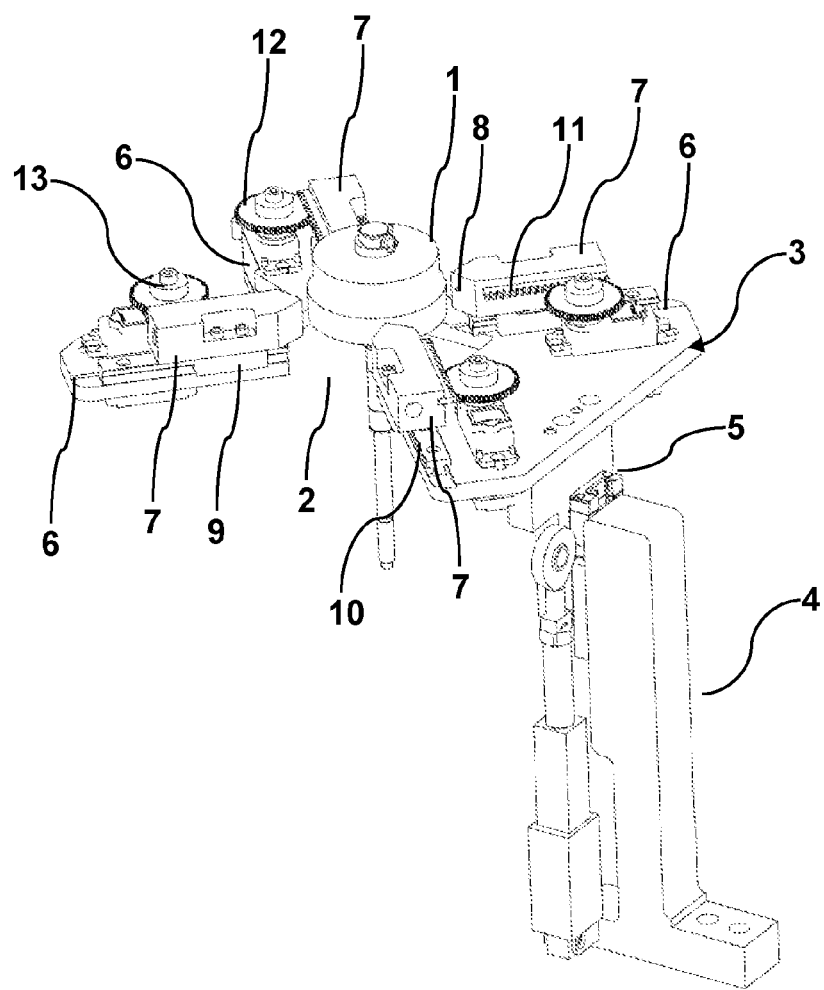

DEVICE FOR PNEUMATICALLY DRIVING A ROTOR IN A BALANCING MACHINE, AND BALANCING MACHINE HAVING A DEVICE OF SAID TYPE

CROSS REFERENCE TO RELATED APPLICATIONS

This application is the National Stage of PCT/DE2020/100954 filed on Nov. 6, 2020, which claims priority under 35 U.S.C. § 119 of German Application No. 10 2019 132 197.2 filed on Nov. 27, 2019, the disclosure of which is incorporated by reference. The international application under PCT article 21(2) was not published in English.

The invention relates to a device for pneumatically driving a rotor in a balancing machine, having at least one drive nozzle and one braking nozzle which are arranged on a base plate with a spacing to the rotor. The invention also relates to a balancing machine having a device of said type.

Balancing machines for balancing workpieces are widely known in the prior art. As a rule, the workpiece to be balanced is set in rotation by means of a suitable drive and examined for unbalances by sensors. Various drive concepts are also known, for example driven shafts which are connected to the rotor, or circulating belts which act on an outer circumference of the rotor.

Exhaust-driven turbochargers have a turbocharger rotor which often reaches very high operating speeds of more than 100,000 rpm during operation and which must therefore be very precisely balanced to avoid excessive bearing loads and noise. The turbocharger rotor usually consists of a shaft mounted in a bearing housing, which shaft carries a turbine wheel at one end and a compressor wheel at the other end. To measure the unbalance, it is desirable to drive turbocharger rotors at an angular velocity substantially equal to normal operating speed. Said rotors are usually driven by means of compressed air which is directed onto the turbine wheel.

A machine for balancing turbochargers is known from EP 0 699 900 B1, in which the centre housing of a turbocharger core group stripped of the turbine housing and the compressor housing is clamped on an oscillating measuring table and connected to a lubricating oil line. To drive the turbocharger rotor, the turbine wheel is driven by a jet of compressed air that emerges from a nozzle connected to a compressed-air line. With the help of a pressure regulator, the air pressure at the nozzle can be adjusted in such a way that the turbocharger rotor is driven at a rotational speed suitable for the unbalance measurement.

Another pneumatic drive for a rotor in a balancing machine is known from DE 10 2012 102 160 B4, in which the drive power of the drive is controlled as a function of the speed of the rotor using a programmable logic controller having an adjustable internal controller.

Furthermore, DE 10 2005 053 786 A1 discloses a method for dynamically measuring the unbalance of a rotor which is arranged in a housing and rotates at a high angular speed, wherein the rotor is mounted in a separate bearing housing.

A disadvantage of the known pneumatic rotor drives is that a large variety of different rotor types which differ in their geometry means that rotor-type-dependent components need to be used. This results in a greater expenditure of time when retrofitting the balancing machine for a different rotor type. The pneumatic drive also makes retrofitting necessary, because each rotor type usually requires a drive system that is specially adapted thereto and has the appropriate drive plates.

The object of the invention is to simplify the retrofitting of a balancing machine by means of a rotor drive that can be used universally.

The object is achieved by the features of claims 1 and 11. Advantageous embodiments can be found in the dependent claims.

The object is achieved according to the invention by providing a device for pneumatically driving a rotor in a balancing machine, the device having at least one drive nozzle, which is connectable to a compressed-air line and which serves for generating a driving air stream which can be directed onto the rotor, and at least one braking nozzle, which is connectable to a compressed-air line and which serves for generating a braking air flow which can be directed onto the rotor in a direction opposite to the direction of rotation of the rotor, said device also having a base plate which is arrangeable with a spacing to the rotor and on which the nozzles are movably arranged, such that the spacing between the nozzles and the rotor is adjustable. The positions of the nozzles can be changed depending on the rotor to be balanced, such that the drive and braking nozzles can be adjusted independently of the rotor type and changing the rotor does not require manual retrofitting of the drive. The device according to the invention can be used universally for a multiplicity of different rotor geometries. In particular, the nozzles on the base plate can be displaced radially to the rotor axis.

It is preferred that the base plate has a passage, such that the base plate is arrangeable at least in part around the rotor in a plane transverse to the rotor axis. The passage can in particular be arranged centrally in the base plate, and the base plate can have a lateral opening through which the rotor can be introduced into the rotor receptacle. A person skilled in the art knows that pneumatically driven rotors in particular, such as components of a turbocharger or a turbocharger core group, are mounted in a balancing machine in such a way that the drive is arranged with a spacing to the rotor, such that compressed air can be fed to the rotatable components. This means that the rotor is not necessarily guided completely through the passage of the base plate, but rather only a part of the rotor or a part of the rotor receptacle is guided therethrough, in such a way that the nozzles arranged on the base plate are arrangeable with a spacing to the rotor and it is ensured that the rotor is driven.

In order to further improve the adjustability and the handling of the device, the base plate can be axially displaceable along the rotor axis. This means that the base plate is in particular adjustable in height. To load the balancing machine with the rotor, the base plate can be moved into a loading position in which the balancing machine can be loaded quickly and easily with the rotor. After loading, the base plate can be moved into the drive position, in which the rotor can be driven.

The displacement of the base plate can be done manually using simple displacement means such as rails. However, the base plate can also be automatically moved axially along the rotor axis with the aid of an electric motor.

The handling of the base plate can be further improved in that the base plate comprises at least two base plate parts which each carry at least one nozzle and are connectable to one another to form the base plate. The base plate parts can be connected to one another, for example, by means of screw connections. This can be advantageous, for example, for loading the balancing machine and can also simplify maintenance of the drive or replacement of individual components.

Furthermore, at least one base plate part can be connectable in an articulated manner to a further base plate part. For loading the balancing machine, the articulated and thus pivotable base plate part can be moved into a position in which easy loading is possible.

In one embodiment, the mobility of the nozzles on the base plate can be achieved by arranging each nozzle, in particular as a component of a drive unit, on a carriage which can be moved on a rail fixed on the upper side of the base plate. The nozzles can be moved together with the carriage on the base plate and into a position in which compressed air can be guided onto the rotor. In particular, it is preferred that the carriages having the nozzles can be moved radially to the rotor axis.

The carriages can be moved on the rails, for example by hand, and it can be advantageous if defined positions are provided on the rails, at which positions the carriage can be locked by means of holding devices. The positions preferably correspond to position data of the nozzles in which optimal driving for a rotor type is achieved, and which data have been determined empirically, for example. As a result of this, the carriages having the nozzles can be positioned manually in a simple manner depending on the rotor which is to be balanced and loaded into the balancing machine and the rotor geometry thereof.

However, an electric motor can also be arranged on each carriage, which electric motor moves the carriage on the rails. The position of the carriage and thus of the nozzle relative to a rotor type is preferably stored in a data memory and is read out when the rotor is changed, such that the electric motor, for example a linear motor, moves the carriage to the predefined position.

In a further embodiment, a rack is provided on each carriage, which rack can be brought into engagement with a gear wheel which is arranged with a spacing to the rack and is rotatable about the axis of said gear wheel. Due to the engagement of the gear wheel with the rack, a rotation of the gear wheel causes the carriage having the nozzle to move, such that the spacing between the nozzle and the rotor is adjustable. The gear wheel can be moved manually. However, an electric motor can also be provided on each gear wheel for rotating the gear wheel, such that the movement of the carriage having the nozzle takes place automatically. In this regard, it is advantageous if the position data of the nozzles for a rotor type are stored in a data memory and are read in automatically when the rotor is changed, such that the position of the nozzles is changed depending on the rotor type.

The invention further relates to a balancing machine having a rotor receptacle for mounting the rotor, a device according to the preceding embodiments for pneumatically driving the rotor, and a measuring device for measuring the rotor unbalance, wherein the nozzles arranged on the base plate can be positioned with a spacing to the rotor in such a way that a driving air stream which can be generated by at least one drive nozzle can be directed onto the rotor, and a braking air flow which can be generated by at least one braking nozzle can be directed onto the rotor in a direction opposite to the direction of rotation of the rotor. The position of the nozzles for driving the rotor can in particular be changed automatically depending on the rotor geometry or the rotor type by moving the nozzles on the base plate, in particular radially to the rotor axis, such that the spacing between the nozzles and the rotor is adjustable. This ensures a rotor-type-specific supply of compressed air to the rotor. In order to achieve quick and easy adjustment of the nozzles, it can be advantageous for rotor-specific position data of the nozzles to be stored in a data memory and to be called up automatically by the balancing machine for adjusting the nozzle positions. Otherwise, reference is made to the above configurations and explanations, which apply analogously to the balancing machine.

The invention is explained in more detail below using an embodiment of the invention which is shown in the drawings.

FIG. 1 is a section of a pneumatic drive in a balancing machine. A rotor 1 (shown in the drawing) is mounted in a rotor receptacle (also shown) in the balancing machine. Arranged at least in part around the rotor 1 is a base plate 3 having a passage 2 provided for the rotor 1 to pass therethrough at least in part. The base plate 3 is in particular arranged in a plane perpendicular to the rotor axis.

The base plate 3 can have different geometric shapes and, for example, as shown in FIG. 1, can be planar and partly wrap around the rotor 1. The base plate 3 is open to one side of the rotor 1. Below the base plate 3 there is a holding device 4 for holding the base plate 3 and a displacement device 5 arranged thereon, by means of which displacement device the base plate 3 can be adjusted in height and can be moved axially along the rotor axis. The displacement device 5 can consist, for example, of a rail or carriage construction, with the aid of which the base plate 3 can be manually displaced. However, an electric motor can also be provided, by means of which the base plate 3 can be displaced axially along the rotor axis, for example on rails. The position of the base plate 3 can thus be adjusted automatically.

The base plate 3 can also be designed in multiple parts, it being possible to connect individual base plate parts 6 to one another by means of screw connections. Furthermore, base plate parts 6 can be connected to one another via joints, such that individual base plate parts 6 can be pivoted. However, it can also be preferred that the base plate 3 is made in one piece and consists, for example, of metal, reinforced plastics material or a combination thereof.

Drive units 7 are arranged on the base plate 3 and comprise either drive nozzles or braking nozzles. The nozzles 8 are designed in such a way that compressed air supplied to the nozzles 8 via compressed-air lines can be blown onto rotatable components of the rotor 1 that are provided for driving the rotor 1. The compressed-air lines and the valves required for controlling the compressed air supply, which valves are also components of a drive unit 7 in addition to the nozzles 8, are not shown in FIG. 1. Depending on requirements, the drive can be equipped with two or more nozzles 8. The nozzles are shown only schematically in FIG. 1, but are designed in such a way that, for example, with the aid of compressed air, two drive nozzles can move the rotor 1 in one direction and two braking nozzles can move the rotor 1 in the opposite direction, since the drive nozzles and braking nozzles can blow on the rotor 1 from different directions.

The drive units 7, i.e. in particular the nozzles 8, are movably arranged on the base plate 3, such that the radial spacing between the nozzles 3 and the rotor 1 can be changed. This can be achieved, as shown in FIG. 1, by arranging the nozzles 8 or the drive units 7 on a carriage 9 which is movably mounted on a rail or a plurality of rails 10. The movement of a carriage 9 on a rail 10 and thus the positioning of the nozzle 8 can be achieved, for example, by manually moving the carriage 9 on the rails 10 and locking it in a defined position.

FIG. 1 shows an embodiment in which each carriage 9 has a rack 11 which can be brought into engagement with a gear wheel 12 arranged with a spacing to the rack 11. The gear wheel 12 can be driven in rotation by an electric motor 13, for example a servo motor. The meshing between the gear wheel 12 and rack 11 causes the carriage 9 to move forwards or backwards as a result of the gear wheel 12 rotating, which results in a change in the radial spacing between the nozzle 8 and the rotor 1.

To measure an unbalance in a pneumatically drivable rotor 1, the rotor 1 is clamped into the corresponding receptacle of the balancing machine. The base plate 3 is then moved manually or automatically into a position in which there is a spacing between the nozzle 8 and the rotor 1, which spacing is necessary to drive the rotor 1. The rotor-type-dependent position data of the nozzles 8 and/or the base plate 3 are preferably stored in a data memory of the balancing machine and can be read out after the rotor 1 has been loaded. This means that the rotor-type-dependent position of the base plate 3 can also be stored in the data memory, automatically read out when the rotor is changed, and used to adjust the base plate 3. After the base plate 3 has been brought into position or at the same time as this, the nozzles 8 are positioned by moving the carriages 9 to the rotor-type-dependent position. This means that the radial spacing between the nozzles 8 and rotor 1 is changed. In this defined position of the nozzles 8, it is possible to guide compressed air from the nozzles 8 onto the rotor 1, in particular the pneumatically drivable components thereof, in an optimal manner. If it is desirable for the rotor 1 to run up to the working speed or even a speed above this very rapidly, only the drive nozzle can be supplied with compressed air via a pressure control valve, such that a very rapid run-up is achieved with a higher pressure and without the braking effect of the braking nozzle. Otherwise, both the drive nozzle and the braking nozzle are supplied with compressed air, the nozzles 8 being supplied with compressed air via corresponding valves in such a way that the drive power of the drive nozzle significantly exceeds the braking power of the braking nozzle, such that the rotor 1 is continuously accelerated up to a predetermined target speed. After an unbalance has been measured by one or more measuring devices, the rotor 1 is continuously braked to a standstill by the braking nozzle.

The device according to the invention represents a combination of a pneumatic drive and the mechanical coupling thereof for automatic adjustment of the blowing position. This results in numerous advantages. Inter alia, there is no need to construct a special drive system adapted to the rotor type for each rotor type. With the device according to the invention, it is possible to cover a large variety of rotor types, such that it is no longer necessary to retrofit a drive of a balancing machine when changing the rotor type.

The invention claimed is:

1. A device for pneumatically driving a rotor (1) in a balancing machine, having at least one drive nozzle (8), which is connectable to a compressed-air line and which serves for generating a driving air stream which can be directed onto the rotor (1), and at least one braking nozzle (8), which is connectable to a compressed-air line and which serves for generating a braking air flow which can be directed onto the rotor (1) in a direction opposite to the direction of rotation of the rotor (1), said device also having a base plate (3) which is arrangeable with a spacing to the rotor (1) and on which the nozzles (8) are movably arranged, such that the spacing between the nozzles (8) and the rotor (1) is adjustable.

2. The device according to claim 1, wherein the base plate (3) has a passage (2), such that the base plate (3) is arrangeable at least in part around the rotor (1) in a plane transverse to the rotor axis.

3. The device according to either of the claim 1, wherein the base plate (3) comprises at least two base plate parts (6) which are connectable to one another and which each carry at least one of the nozzles (8).

4. The device according to claim 3, wherein at least one base plate part (6) is connectable in an articulated manner to a further base plate part (6).

5. The device according to claim 1, wherein the nozzles (8) on the base plate (3) can be displaced radially to the rotor axis.

6. The device according to claim 1, wherein each one of the nozzles (8) is arranged on a carriage (9) which can be moved on a rail (10) fixed on the upper side of the base plate (3).

7. The device according to claim 6, wherein defined positions are provided on the rails (10), at which positions the carriage (9) can be locked by means of holding devices.

8. The device according to claim 6, wherein an electric motor is arranged on each carriage (9), which electric motor moves the carriage (9) on the rails (10).

9. The device according to claim 6, wherein a rack (11) is provided on each carriage (9) and can be brought into engagement with a gear wheel (12) which is arranged with a spacing to the rack (11) and is rotatable about the axis of said gear wheel.

10. The device according to claim 9, wherein an electric motor (13) is provided on each gear wheel (12) for rotating the gear wheel (12).

11. A balancing machine having a rotor receptacle for mounting the rotor (1), the device according to claim 1 for pneumatically driving the rotor (1), and a measuring device for measuring the rotor unbalance, wherein the nozzles (8) arranged on the base plate (3) can be positioned with a spacing to the rotor (1) in such a way that the driving air stream which can be generated by the at least one drive nozzle (8) can be directed onto the rotor (1), and the braking air flow which can be generated by the at least one braking nozzle (8) can be directed onto the rotor (1) in a direction opposite to the direction of rotation of the rotor (1).

12. The balancing machine according to claim 11, wherein the radial spacing between the nozzles (8) and the rotor (1) is automatically adjustable depending on the particular rotor type.

13. The balancing machine according to claim 11, wherein rotor-specific position data for the nozzles (8) can be stored in a data memory and can be called up automatically by the balancing machine for adjusting the nozzle positions.

14. The balancing machine according to claim 11, wherein the base plate (3) can be displaced axially along the rotor axis.

15. The balancing machine according to claim 14, wherein the base plate (3) can be automatically moved axially along the rotor axis with the aid of an electric motor.

* * * * *

UNITED STATES PATENT AND TRADEMARK OFFICE
CERTIFICATE OF CORRECTION

PATENT NO. : 12,146,805 B2
APPLICATION NO. : 17/778688
DATED : November 19, 2024
INVENTOR(S) : Florian Dierbach et al.

Page 1 of 1

It is certified that error appears in the above-identified patent and that said Letters Patent is hereby corrected as shown below:

In the Claims

In Column 6, Line 8 (Line 1 of Claim 3): after "to" delete "either of the"

Signed and Sealed this
Seventeenth Day of December, 2024

Derrick Brent
*Acting Director of the United States Patent and Trademark Office*